United States Patent Office 3,464,306
Patented Sept. 2, 1969

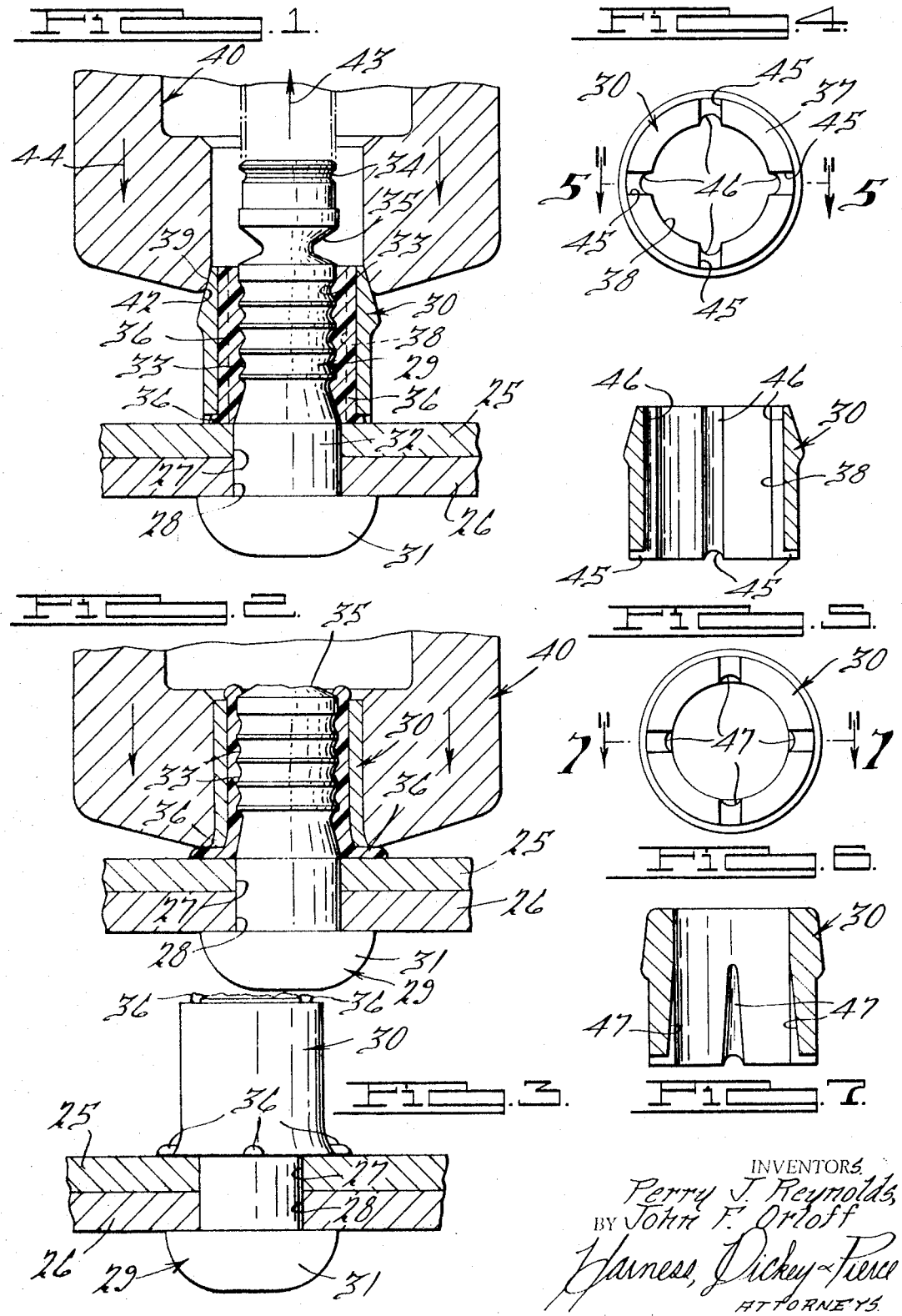

3,464,306
COMBINATION SEALANT RELIEF GROOVE IN COLLAR
Perry J. Reynolds, Detroit, and John F. Orloff, Mount Clemens, Mich., assignors to Huck Manufacturing Company, Detroit, Mich., a corporation of Michigan
Filed Dec. 14, 1967, Ser. No. 690,459
Int. Cl. F16b 19/12, 21/20
U.S. Cl. 85—7 . 3 Claims

ABSTRACT OF THE DISCLOSURE

A swage type fastener of the pull type in which a collar is swaged into locking grooves of the pin and in which the collar has a smooth I.D. throughout its length and is provided with relief passages in one end of the collar and communicating longitudinal passages in the I.D. so that fluid sealant cannot be trapped in the locking grooves of the pin and reduce the strength of the fastener.

---

This invention relates generally to fasteners of the type in which a collar is deformed into interlocking engagement with a peripherally grooved locking portion of a pin and more particularly to an improved fastener of this type in which the collar has a smooth internal diameter throughout the length thereof and has relief grooves that prevent trapping of any flowable material in the locking grooves when the fastener is finally set.

Fasteners of this general type are known in which the relief groove for preventing any trapping of the fluid is provided in the preformed locking grooves in the pin.

The two-part fastener of this invention is preferably of the pull type lockbolt. Such a lockbolt includes a pin having a preformed head adapted to be inserted through aligned openings from one side of the work and a collar adapted to be disposed over the pin at the opposite side of the work. The work usually consists of two or more plate or panel members having substantially aligned openings through which the pin extends. The pin head engages the outside surface of one of the plate members and the collar engages the outside surface of the other plate member and is positioned in substantial embracing relationship with that portion of the pin which is formed with the peripheral lock grooves. In some applications in industry, a layer of a sealant, which is of the consistency of paste or a very thick fluid, is disposed between the plates; and during insertion of the pin through the openings in the plate members, this sealant is wiped onto and partially or completely fills the locking grooves in the pin.

The sealant in the locking grooves can become trapped during installation and prevent an effective flowing of the collar metal into the locking grooves. This prevents the desired strong interlock between the collar and pin. It is an object of this invention, therefore, to provide fasteners of two-part pin and collar swage types which have the collar formed with relief grooves extending from the inside to the outside so that the sealant material may escape through the relief grooves during installation. This prevents a hydrostatic lock in the driven fastener and assures a fastening of proper and consistent high strength.

Other objects of the invention will become apparent from the following description and drawings and from the claims hereinafter set forth.

In the drawings in which like numerals are used to designate like parts in the several views throughout;

FIGURE 1 is a cross-sectional view with parts in elevation showing a pull type fastener applied to the work and the setting tool in position prior to swaging;

FIGURE 2 is a view similar to FIGURE 1 and showing the driving tool in its final position with the fastener completely installed;

FIGURE 3 is an elevational view of the installed fastener showing the plate members in cross-section;

FIGURE 4 is an end elevational view of the collar shown in FIGURES 1, 2 and 3;

FIGURE 5 is a cross-sectional view taken substantially along the line 5—5 of FIGURE 4;

FIGURE 6 is a view similar to FIGURE 4 and showing a modified form of the collar of the present invention; and FIGURE 7 is a cross-sectional view taken substantially along the line 7—7 of FIGURE 6.

Referring to FIGURES 1 through 5, the present invention is illustrated with a pull type lockbolt of the type disclosed in Huck Patent No. 2,531,048, granted Nov. 21, 1950.

Panel members 25 and 26 are provided with aligned openings 27 and 28. Sealant which is provided between the panels 25 and 26, must be relieved so that it is not locked in the grooves of the pin to be assured of a strong fastening.

The fastener comprises a pull type lockbolt pin generally indicated at 29 having a collar generally indicated at 30 applied thereto. The pin 29 has an integral head 31, a smooth cylindrical shank portion 32, and annular locking grooves 33 formed in the periphery thereof. A pin tail 34 having the usual annular pull grooves is formed as an intergal extension of the locking groove portion of the pin 29 and an annular breakneck 35 is formed between the pull portion of the locking portion.

The pin 31 is inserted through the aligned openings 27 and 28 and during such insertion fluid sealant indicated 36 coats the pin and collects within the locking grooves 33.

The collar 30 is disposed over the projecting end of the pin 29 so that the inner face 37 of the collar bears against the outer adjacent face of the panel 25. The collar 30 is formed with a smooth longitudinal bore 38 which overlies the locking grooves. The outer surface of the collar is formed with an annular hold-off taper 39 in the collar illustrated.

A known driving tool generally indicated at 40 is used to set the lockbolt and such driving tool comprises an anvil 41 having an annular taper 42 which bears against the tapered shoulder 39 of the collar 30 when the tool is in position for driving. The tool has other mechanisms (not shown) which engage the pull grooves 34 and exert a pulling force in the direction of the arrow 43. A reaction force causes the anvil 41 to move in the direction of the arrows 44 from the position shown in FIGURE 1 to the final position shown in FIGURE 2. When the anvil reaches this position, a built-up reaction force causes the pin to break at the breakneck 35.

During this swaging operation, the collar 30 is progressively swaged into the locking grooves 33 to the final swage position shown in FIGURE 2 and to force the material of the collar into the locking grooves 33 to effect an interlock between the pin and collar.

As stated above, in order to be assured of a strong fastening, the fluid 36 must be relieved. In this embodiment the relief is provided by radially extending grooves 45 formed in the end face 37 of the collar 30 which are aligned with and are in open communication with longitudinally extending grooves 46 formed in the I.D. of the collar throughout the length thereof. Thus, as the swaging takes place from the position shown in FIGURE 1 to that shown in FIGURE 2, the sealant 36 is forced out of the collar. The grooves 45 extend from the inward cavity of the collar to the outside of the collar so that the sealant 36 is forced along the grooves 46 and outwardly through the grooves 45 and also out of the opposite end of the collar. Any hydrostatic pressure that may have tended to form would be relieved.

In FIGURES 6 and 7, a modified form of the invention is illustrated in which instead of having the grooves 46 extend the full length of the collar, similar relief grooves 47 are formed in the I.D., but only for a part of the length of the collar. While this is not as effective as having the passages 46 extend the full length of the collar, it has been found to be satisfactory for some purposes.

Formal changes and variations may be made in the various embodiments of the invention described without departing from the spirit and scope of the invention as set forth in the appended claims.

What is claimed is:

1. A fastening device for securing together a plurality of faying surfaces of members having aligned openings and compressible sealant between the members comprising, in combination, a pin extending through said openings having peripheral locking grooves in the extending portion to which said sealant material is applied during application and an annular collar positioned about said locking grooves into engagement with the surface of the adjacent member and adapted to be swaged so that portions thereof project into said grooves to provide for an interlocking engagement of the collar and the pin; said collar having a smooth internal diameter throughout its length and being provided with a plurality of relief grooves in one end of the collar which extend from the inside of said collar to the outside thereof and which communicate with longitudinally extending relief grooves in the internal diameter of the collar for exhausting said sealant material disposed in said locking grooves during swaging.

2. A fastener according to claim 1, in which the longitudinal relief grooves extend the full length of the collar.

3. The fastener according to claim 1 in which said longitudinal relief grooves terminate at a point spaced from the end opposite said one end of said collar.

References Cited

UNITED STATES PATENTS

| Re. 19,865 | 2/1936 | Eastman. | |
| 2,147,356 | 2/1939 | Scholtes | 285—256 |
| 2,273,398 | 2/1942 | Couty et al. | 285—350 |
| 2,978,263 | 4/1961 | Walsh et al. | |
| 3,139,786 | 7/1964 | Ardell | 85—7 |
| 3,203,300 | 8/1965 | Marschner | 85—7 |
| 3,339,003 | 8/1967 | Cessna | 85—1 |
| 3,362,276 | 1/1968 | Gould | 85—8.6 |

FOREIGN PATENTS

| 913,759 | 12/1962 | Great Britain. |
| 969,945 | 9/1964 | Great Britain. |

MARION PARSONS, Jr., Primary Examiner